(12) United States Patent
Li et al.

(10) Patent No.: US 10,738,630 B2
(45) Date of Patent: Aug. 11, 2020

(54) PLATFORM APPARATUS FOR PROPULSION ROTOR

(71) Applicant: General Electric Company, Schenectady, NY (US)

(72) Inventors: Qiang Li, Shanghai (CN); Nicholas Joseph Kray, Mason, OH (US); Gerald Alexander Pauley, Hamilton, OH (US); Ming Xie, Beavercreek, OH (US); Jorge Orlando Lamboy, Liberty Township, OH (US); Tod Winton Davis, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 15/898,690

(22) Filed: Feb. 19, 2018

(65) Prior Publication Data
US 2019/0257210 A1  Aug. 22, 2019

(51) Int. Cl.
*F01D 5/22* (2006.01)
*F01D 9/04* (2006.01)
(Continued)

(52) U.S. Cl.
CPC ............. *F01D 9/041* (2013.01); *F01D 5/282* (2013.01); *F01D 5/3007* (2013.01);
(Continued)

(58) Field of Classification Search
CPC .... F01D 11/006; F01D 11/008; F01D 5/3007; F01D 5/3069; F05D 2240/80; F04D 29/329; F04D 29/34
(Continued)

(56) References Cited

U.S. PATENT DOCUMENTS 2,685,405 A * 8/1954 Stalker .................. F04D 29/522
415/58.1
2,996,281 A * 8/1961 Creek ..................... F01D 5/027
416/213 R
(Continued)

FOREIGN PATENT DOCUMENTS

| CN | 104884743 | 9/2015 | |
| CN | 105909557 | 8/2016 | |
| DE | 102009023840 A1 * | 12/2010 | ............. F01D 5/082 |

OTHER PUBLICATIONS

English translation DE102009023840A1 (Year: 2010).*
(Continued)

*Primary Examiner* — Eldon T Brockman
*Assistant Examiner* — Wesley Le Fisher
(74) *Attorney, Agent, or Firm* — General Electric Company; Kristi Davidson

(57) ABSTRACT

A platform apparatus for a propulsion rotor having an annular array of airfoils carried by a rotor disk. The apparatus includes: at least one forward segment comprising an arcuate forward body having a plurality of spaced-apart axially-extending forward fingers, each of the forward fingers bounded by a curved first lateral edge interconnected to a straight second lateral edge by an aft edge, wherein the forward segment defines a flow path surface and an opposed back surface; at least one aft segment comprising an arcuate aft body having a plurality of spaced-apart actually-extending aft fingers, each of the aft fingers bounded by a curved first lateral edge interconnected to a straight second lateral edge by a forward edge, wherein the aft segment defines a flow path surface and an opposed back surface, and wherein the aft edges have a shape complementary to a shape of the forward edges.

19 Claims, 7 Drawing Sheets

(51) Int. Cl.
*F01D 5/28* (2006.01)
*F01D 25/24* (2006.01)
*F01D 5/30* (2006.01)
*F01D 11/00* (2006.01)

(52) U.S. Cl.
CPC .......... *F01D 11/008* (2013.01); *F01D 25/246* (2013.01); *F05D 2220/323* (2013.01); *F05D 2220/40* (2013.01)

(58) Field of Classification Search
USPC ..................................................... 416/193 A
See application file for complete search history.

(56) References Cited

U.S. PATENT DOCUMENTS

| | | | | |
|---|---|---|---|---|
| 4,451,202 A * | 5/1984 | Hauser | ...................... | F01D 5/34 416/214 R |
| 5,263,823 A * | 11/1993 | Cabaret | ................. | F01D 11/006 416/218 |
| 5,277,548 A * | 1/1994 | Klein | ................... | F01D 11/008 29/889.21 |
| 5,580,217 A * | 12/1996 | Richards | ............... | F01D 11/006 416/193 A |
| 5,660,526 A | 8/1997 | Ress, Jr. | | |
| 6,217,283 B1 | 4/2001 | Ravenhall et al. | | |
| 6,447,250 B1 | 9/2002 | Corrigan et al. | | |
| 6,514,045 B1 * | 2/2003 | Barton | ...................... | F01D 5/22 416/193 A |
| 7,458,769 B2 | 12/2008 | Forgue et al. | | |
| 8,672,630 B2 | 3/2014 | Suciu et al. | | |
| 9,039,376 B2 | 5/2015 | Udall et al. | | |
| 9,140,133 B2 | 9/2015 | Hagan et al. | | |
| 9,194,252 B2 | 11/2015 | Farah et al. | | |
| 9,200,593 B2 | 12/2015 | Huth | | |
| 9,228,444 B2 * | 1/2016 | Evans | ..................... | F01D 5/225 |
| 2007/0217915 A1 * | 9/2007 | Fujimura | ............... | F01D 5/3015 416/219 R |
| 2011/0037233 A1 * | 2/2011 | Harper | .................. | F01D 11/008 277/551 |
| 2011/0076148 A1 * | 3/2011 | Fulayter | ................ | F01D 5/3015 416/204 R |
| 2011/0142651 A1 * | 6/2011 | Lhoest | ...................... | F01D 5/26 416/182 |
| 2012/0301317 A1 * | 11/2012 | Alvanos | .................. | F01D 5/147 416/241 B |
| 2014/0105749 A1 * | 4/2014 | Pellenc | ................. | F04D 29/023 416/210 R |
| 2015/0016960 A1 * | 1/2015 | Ravier | .................... | F04D 29/16 415/111 |
| 2015/0098809 A1 * | 4/2015 | Rannnn | ................... | F01D 11/12 415/173.6 |
| 2016/0017731 A1 | 1/2016 | Becker et al. | | |
| 2016/0102557 A1 * | 4/2016 | Knowlton | ............... | F01D 5/081 416/95 |
| 2016/0177748 A1 | 6/2016 | Walston et al. | | |
| 2018/0119550 A1 * | 5/2018 | Berdou | ..................... | F01D 5/26 |
| 2018/0187562 A1 * | 7/2018 | Thistle | ..................... | F01D 5/22 |

OTHER PUBLICATIONS

English Translation of First Office Action dated Apr. 11, 2020 in connection with Chinese Patent Application No. 2019101121807.3.

* cited by examiner

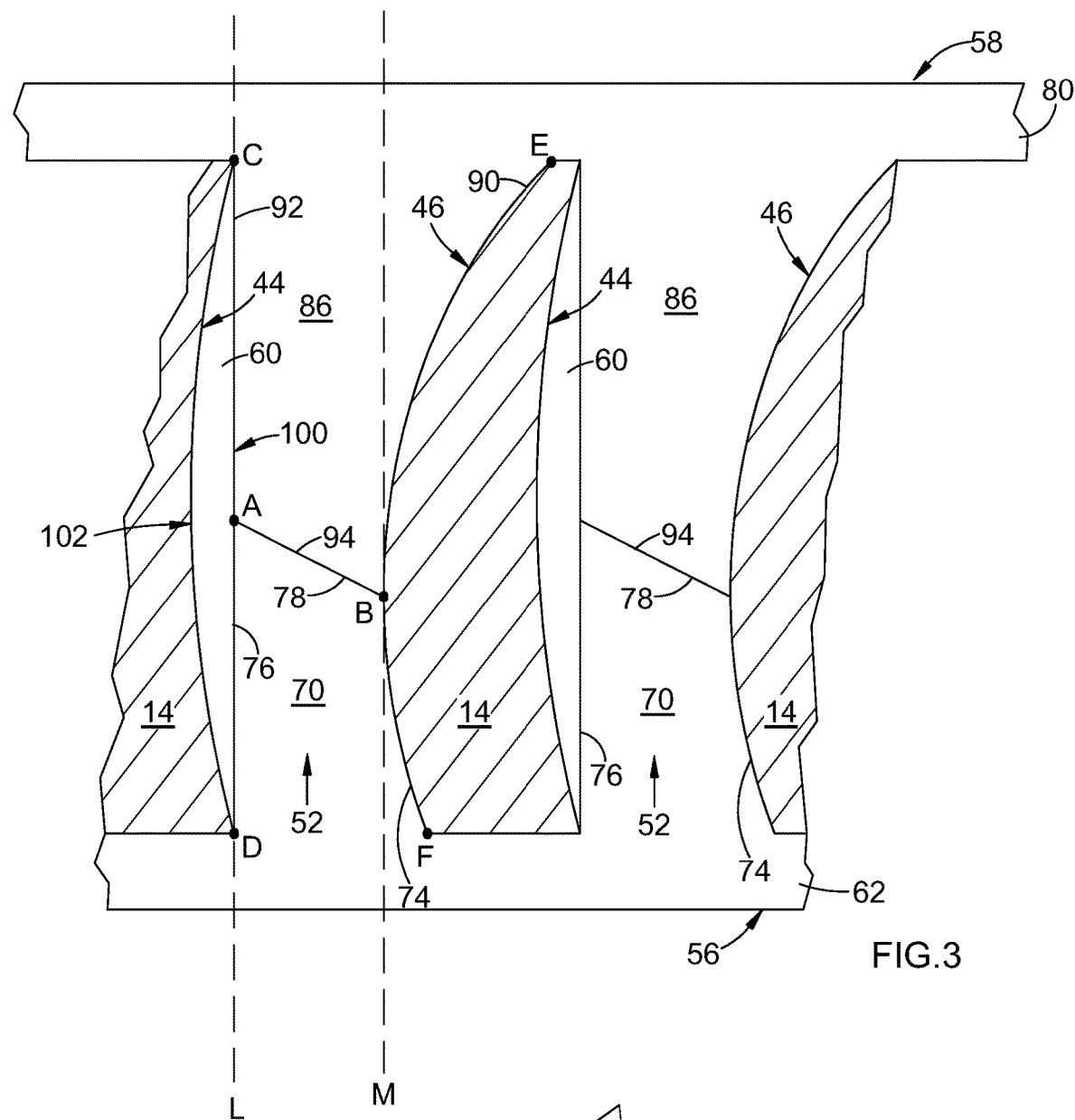
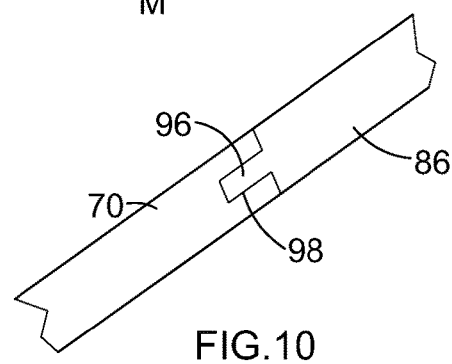

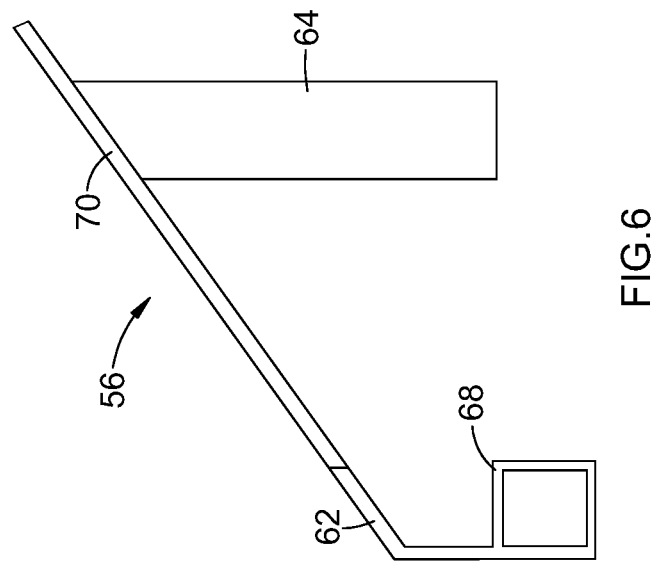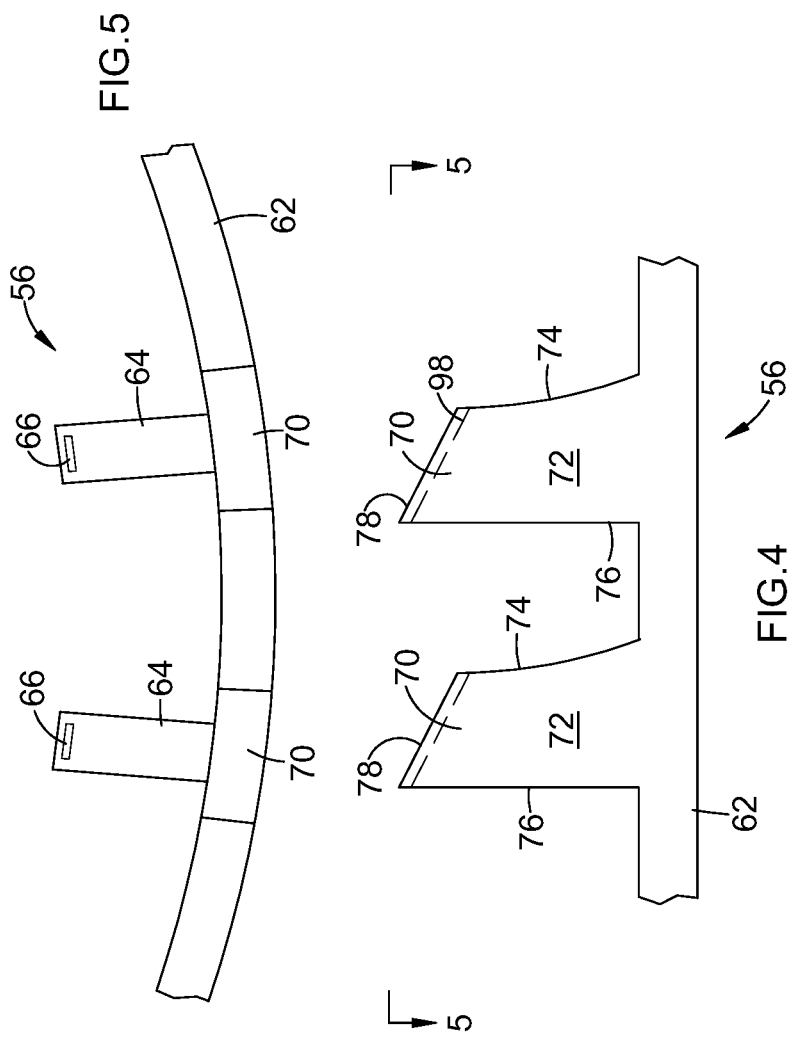

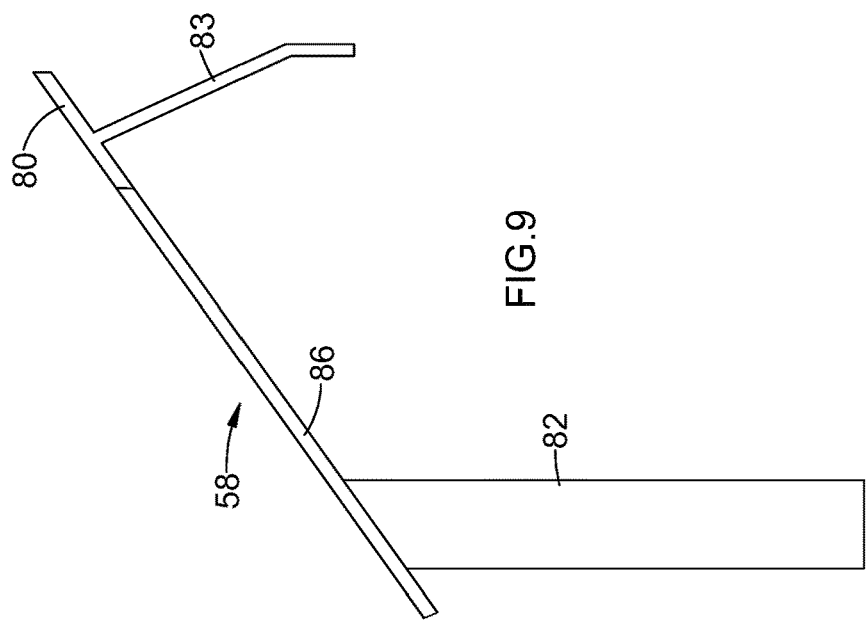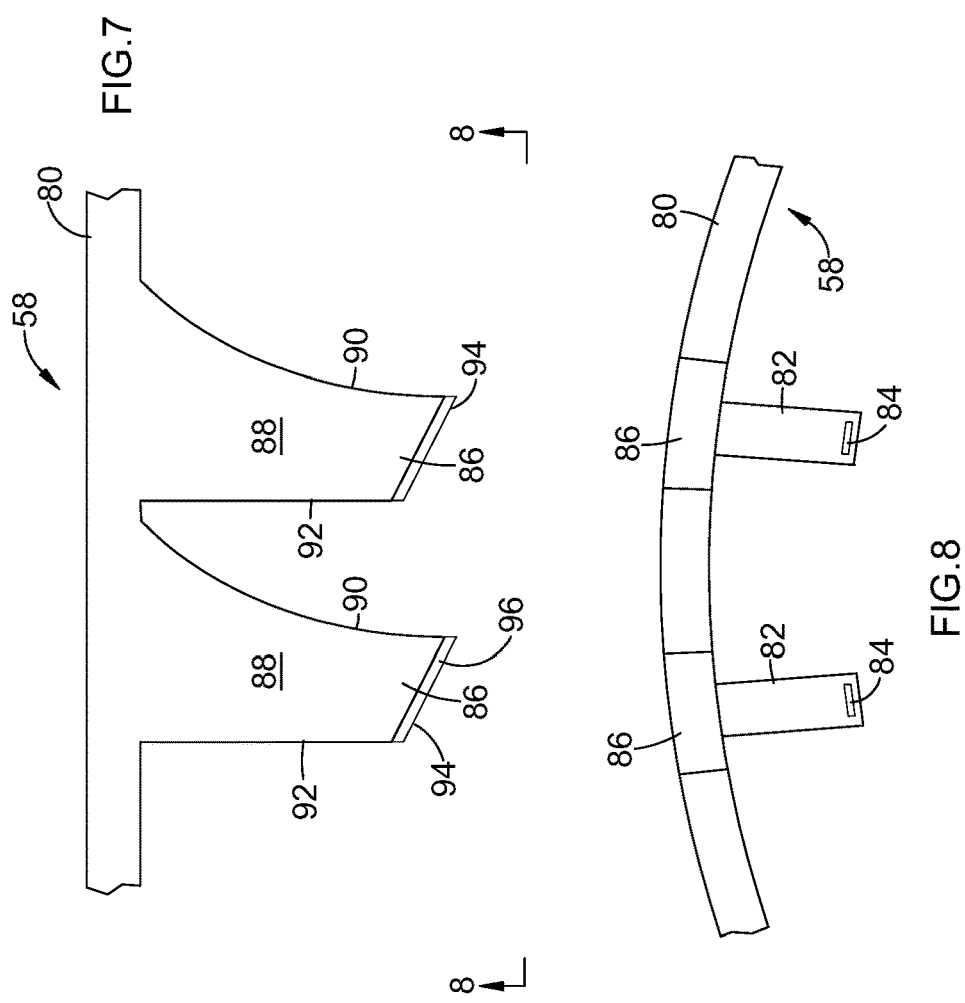

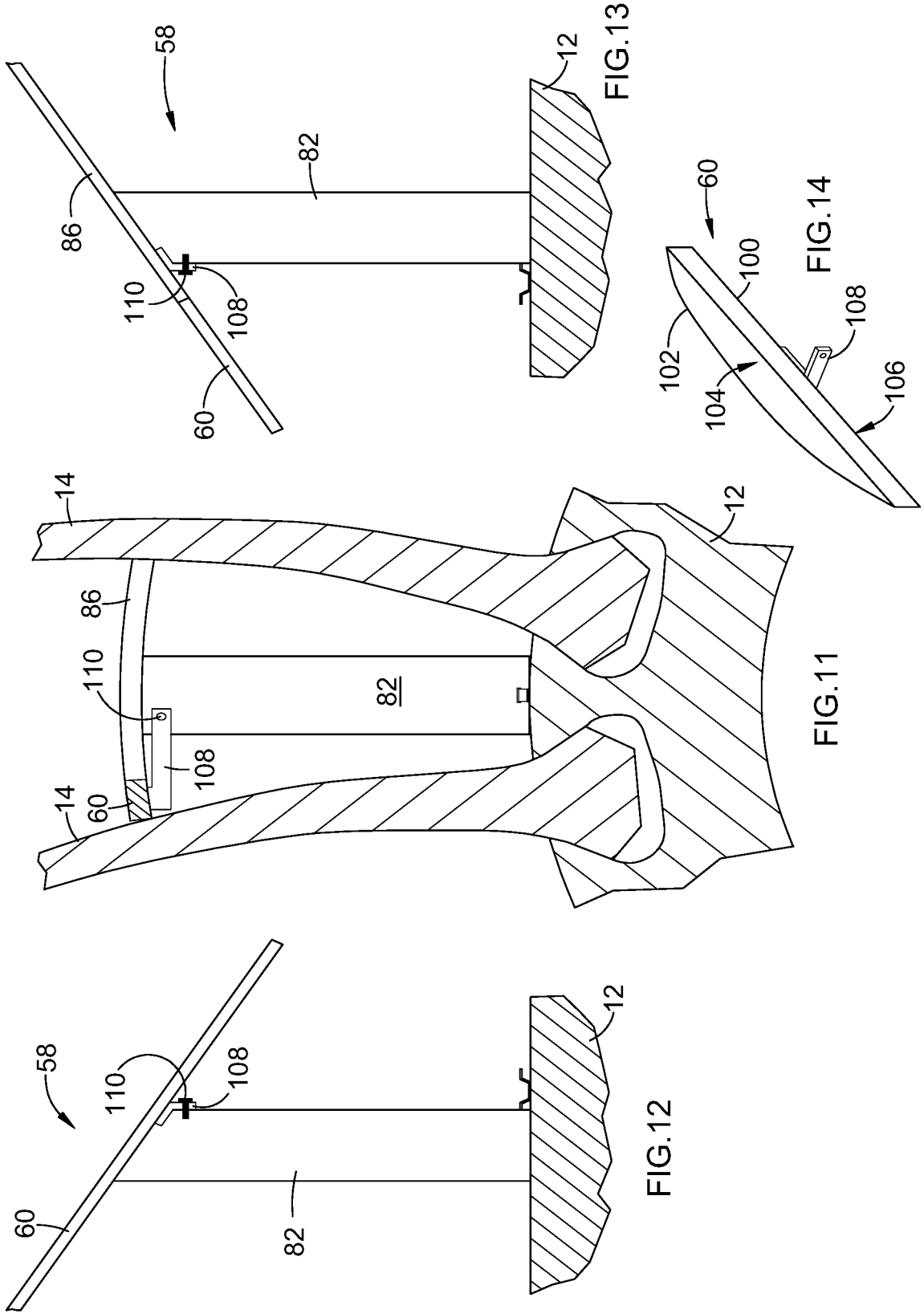

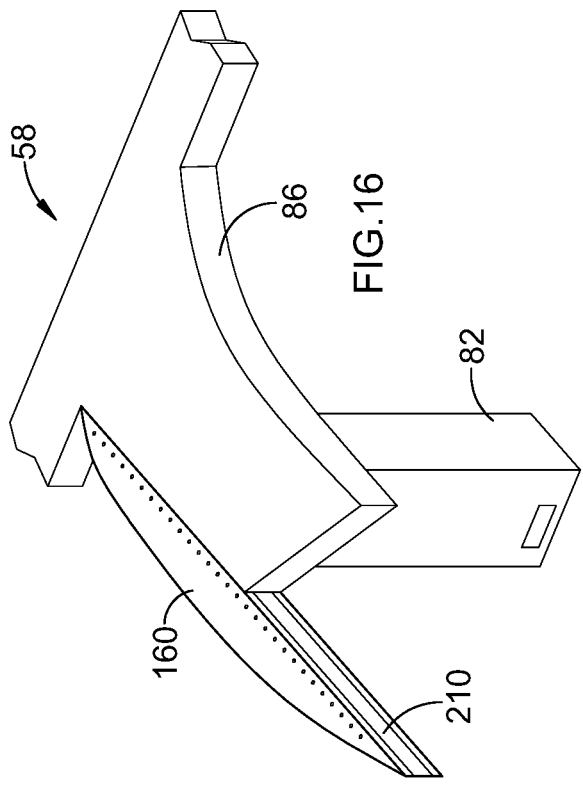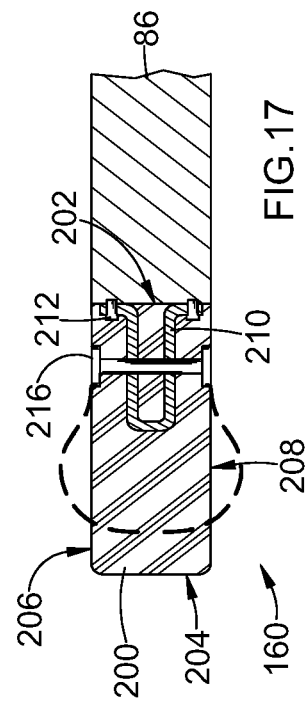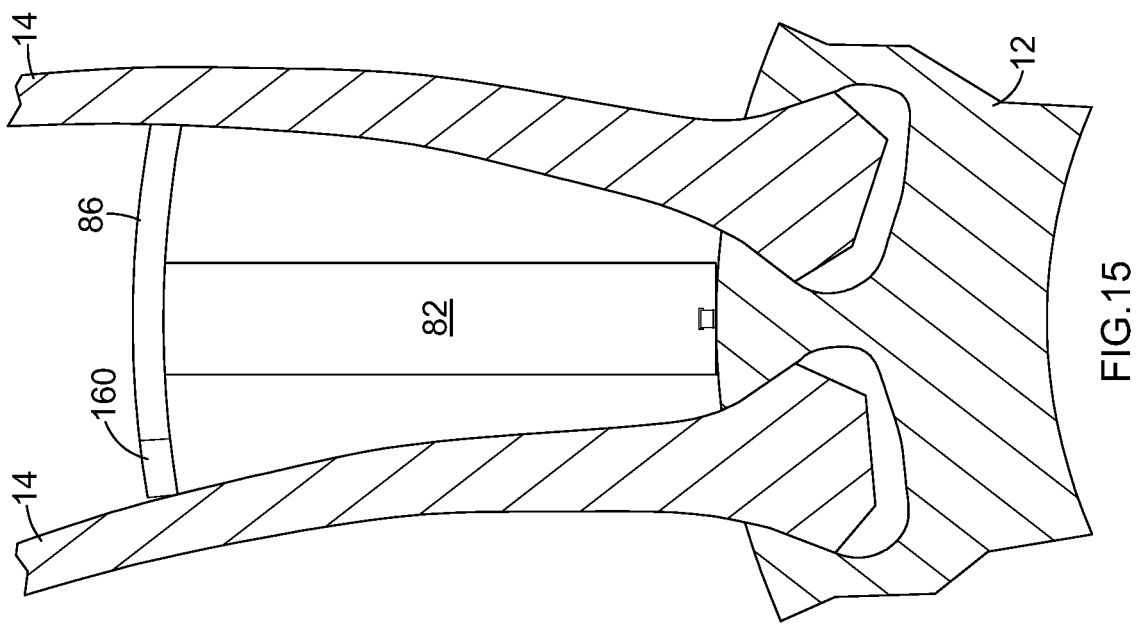

US 10,738,630 B2

PLATFORM APPARATUS FOR PROPULSION ROTOR

BACKGROUND OF THE INVENTION

The present invention relates generally to aircraft propulsion, and more particularly to airflow platforms disposed between adjacent rotor blades in aircraft engines.

A turbofan gas turbine engine used for powering an aircraft in flight typically includes, in serial flow communication, a fan assembly, a low-pressure compressor or booster, a high-pressure compressor, a combustor, a high-pressure turbine, and a low-pressure turbine. The combustor generates combustion gases that are channeled in succession to the high-pressure turbine where they are expanded to drive the high-pressure turbine, and then to the low-pressure turbine where they are further expanded to drive the low-pressure turbine. The high-pressure turbine is drivingly connected to the high-pressure compressor via a first rotor shaft, and the low-pressure turbine is drivingly connected to both the fan assembly and the booster via a second rotor shaft.

The fan assembly includes a plurality of circumferentially spaced-apart fan blades extending radially outwardly from a rotor disk. The fan blades generally comprise an airfoil section and an integral dovetail root section. The dovetail section is slidably received in a complimentary configured dovetail slot formed in the rotor disk so as to attach the blade to the rotor disk.

During engine operation, ambient airflow is channeled between the rotating blades and pressurized thereby generating thrust for powering the aircraft in flight. A radially inner flowpath boundary for the airflow channeled between the blades is provided by fan platforms located between adjacent fan blades. A platform is a small component which acts as a "filler" between two adjacent gas turbine engine fan blades. The outer surface of the platform defines a portion of the generally conical shape of the flowpath between the two fan blades. The platform is physically attached to the rotor.

One problem with prior art platforms is that they are assembled from a plurality of individual pieces, which in increases the complexity and labor required for installation.

BRIEF DESCRIPTION OF THE INVENTION

This problem is addressed by a platform apparatus for a turbomachinery rotor that includes one or more forward segments having a plurality of fingers, and one or more aft segments having a plurality of fingers. The forward and aft segments collectively define blade platforms.

According to one aspect of the technology described herein, a platform apparatus is provided for use with a propulsion rotor of the type including an annular array of airfoils carried by a rotor disk The platform apparatus includes: at least one forward segment comprising an arcuate forward body having a plurality of spaced-apart axially-extending forward fingers, each of the forward fingers bounded by a curved first lateral edge and a straight second lateral edge, the first and second lateral edges being interconnected by an aft edge, wherein the forward segment defines a flow path surface and an opposed back surface; and at least one aft segment comprising an arcuate aft body having a plurality of spaced-apart actually-extending aft fingers, each of the aft fingers bounded by a curved first lateral edge and a straight second lateral edge, the first and second lateral edges being interconnected by a forward edge, wherein the aft segment defines a flow path surface and an opposed back surface, and wherein the aft edges have a shape complementary to a shape of the forward edges.

According to another aspect of the technology described herein, a propulsion rotor apparatus includes: a rotatable rotor disk; a plurality of airfoils arrayed around the disk, such that a plurality of spaces are defined between adjacent airfoils, each airfoil having spaced-apart pressure and suction sides extending radially in span from a root to a tip, and extending axially in chord between spaced-apart leading and trailing edges; and a platform apparatus including: at least one forward segment comprising an arcuate forward body having a plurality of spaced-apart axially-extending forward fingers, each of the fingers bounded by a curved first lateral edge that abuts one of the airfoils, and a straight second lateral edge, the first and second lateral edges being interconnected by an aft edge, wherein the forward segment defines a flow path surface and an opposed back surface; at least one aft segment comprising an arcuate aft body having a plurality of spaced-apart actually-extending aft fingers, each of the aft fingers bounded by a curved first lateral edge that abuts one of the airfoils, and a straight second lateral edge, the first and second lateral edges being interconnected by a forward edge, wherein the aft segment defines a flow path surface and an opposed back surface, and wherein the forward and aft edges have complementary shapes and abut each other; and a plurality of fillers each having a straight first lateral edge abutting the first lateral edges of corresponding forward and aft fingers, and a curved second lateral edge abutting one of the blades.

BRIEF DESCRIPTION OF THE DRAWINGS

The invention may be best understood by reference to the following description taken in conjunction with the accompanying drawing figures in which:

FIG. 3 is a schematic flattened projection top plan view of the platform apparatus shown in FIG. 1;

FIG. 4 is a schematic flattened projection top plan view of a forward segment of the platform apparatus of FIG. 1;

FIG. 5 is a view taken along lines 5-5 of FIG. 4;

FIG. 6 is a side elevation view of the forward segment shown in FIG. 4;

FIG. 7 is a schematic flattened projection top plan view of an aft segment of the platform apparatus of FIG. 1;

FIG. 8 is a view taken along lines 8-8 of FIG. 7;

FIG. 9 is a side elevation view of the aft segment shown in FIG. 7;

FIG. 10 is a partial side elevation view showing interlocking portions of forward and aft segments of a platform apparatus;

FIG. 11 is a partially-sectioned front elevation view of a rotor incorporating a first embodiment of a filler;

FIG. 12 is a right side elevation view of the filler shown in FIG. 11;

FIG. 13 is a left side elevation view of the filler shown in FIG. 11;

FIG. 14 is a schematic perspective view of the filler shown in FIG. 11;

FIG. 15 is a partially-sectioned front elevation view of a rotor incorporating a second embodiment of a filler;

FIG. 16 is a schematic perspective view of the filler shown in FIG. 15; and

FIG. 17 is a cross-sectional view of a portion of the filler shown in FIG. 15.

DETAILED DESCRIPTION OF THE INVENTION

Figure 1:
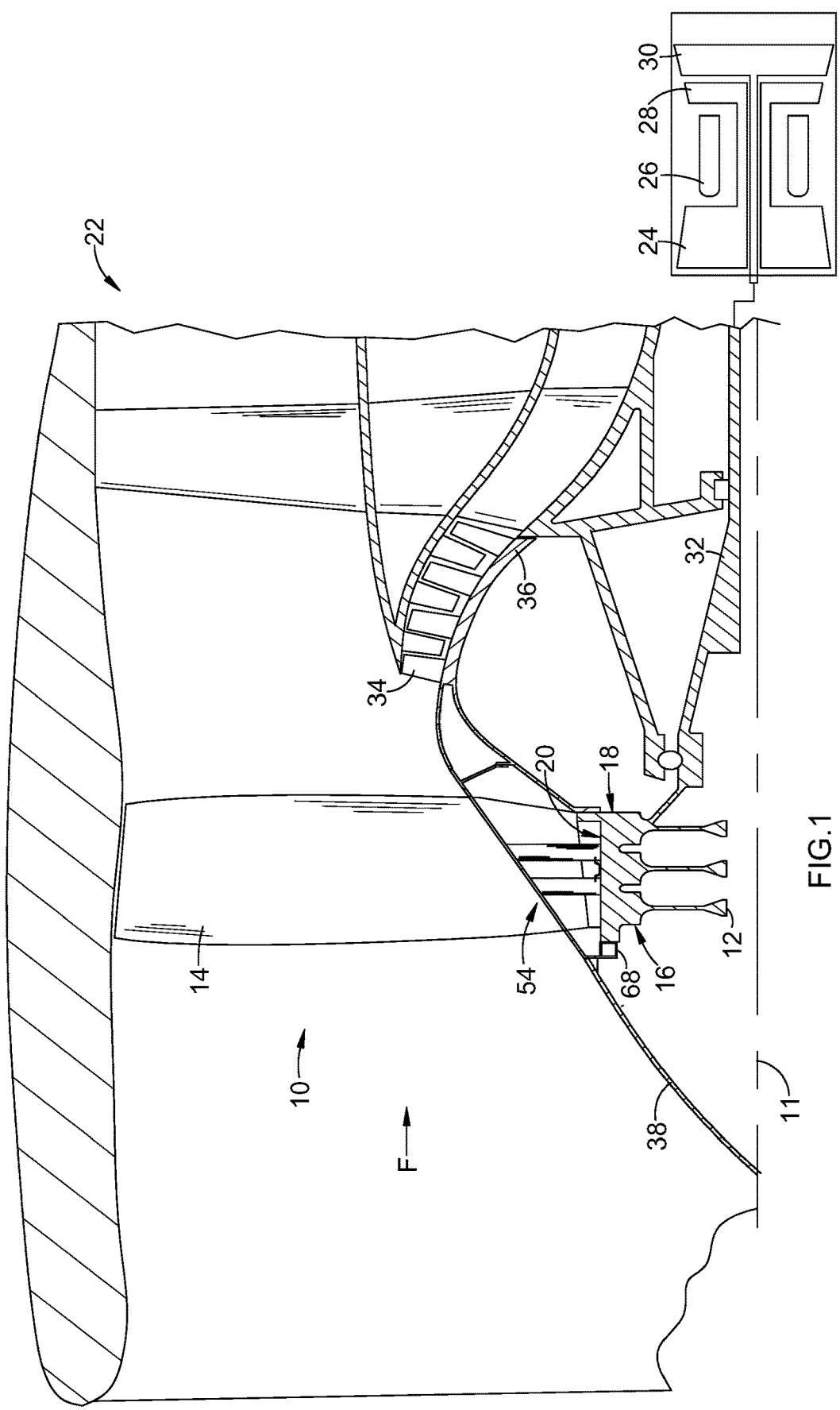
FIG. 1 is a schematic cross-sectional view of a gas turbine engine including a fan assembly with a platform apparatus.

Referring to the drawings wherein identical reference numerals denote the same elements throughout the various views, FIG. 1 shows an exemplary fan assembly 10 used for powering an aircraft in flight. The fan assembly 10 includes a rotor disk 12 mounted for rotation about a centerline axis 11. A Plurality of circumferentially spaced apart fan blades 14 extend radially outward from the rotor disk 12 (only one fan blade 14 is shown in FIG. 1). The rotor disk 12 includes axially spaced-apart forward and aft faces 16 and 18, respectively, and a radially outer surface 20 extending therebetween.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrows "F" in FIG. 1. These directional terms are used merely for convenience in description and do not require a particular orientation of the structures described thereby.

The fan assembly 10 is coupled to a prime mover. The prime mover may be any device operable to rotate the fan assembly 10 at a required speed under expected mechanical and aerodynamic loads. Nonlimiting examples of prime movers include heat engines, motors (e.g. electric, hydraulic, or pneumatic), or combinations thereof (for example electric hybrid drivetrains). In the illustrated example, the fan assembly 10 is incorporated into a turbofan engine 22, which is a type of a gas turbine engine including in serial flow communication a high-pressure compressor 24, a combustor 26, a high-pressure turbine 28, and a low-pressure turbine 30. The low-pressure turbine 30 drives the fan assembly 10 via a fan shaft 32.

The fan assembly 10 shown in FIG. 1 is generically representative of any "propulsion rotor" including a rotatable rotor disk carrying a plurality of airfoils. The principles described herein are applicable to any such propulsion rotor, such as propellers, ducted fans, unducted fans, and/or compressors. The principles described herein are applicable to propulsion rotors having separate airfoils as well as integrally-bladed rotors or "blisks".

Disposed downstream of the fan assembly 10 is a conventional low-pressure compressor or "booster" 34 having axially spaced apart vane and blade rows, with the blades thereof being joined to a booster spool or shaft 36. The booster shaft 36 is suitably coupled to the rotor disk aft face 18. A generally conical spinner 38 is joined to the rotor disk 12 to provide an aerodynamic flow path for air flow F entering the fan assembly 10.

Figure 2:
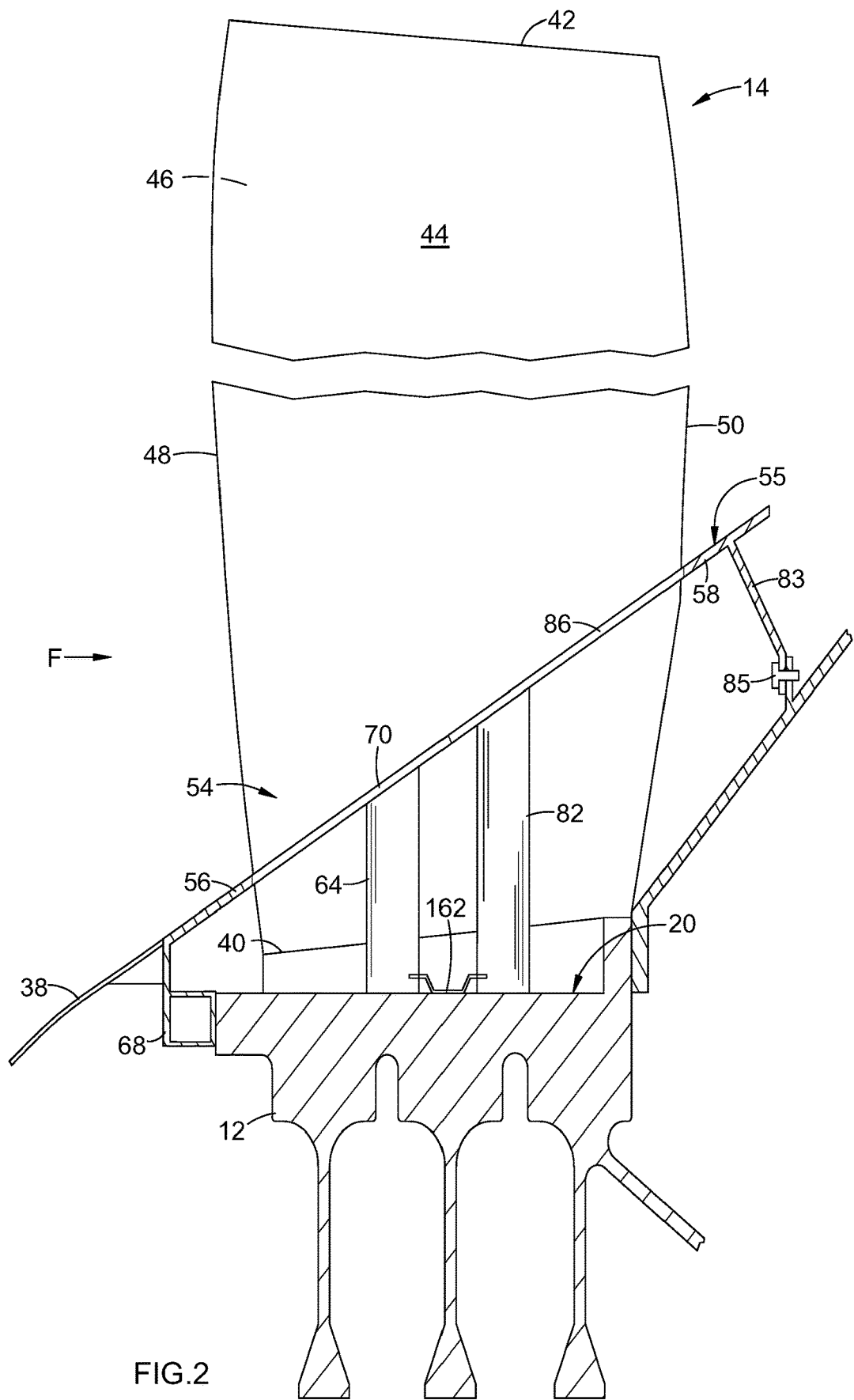
FIG. 2 is an enlarged view of a portion of the fan assembly of FIG. 1.

Referring to FIGS. 2 and 3, each fan blade 14 extends from a root 40 to a tip 42, and includes a generally concave pressure side 44, joined to a generally convex suction side 46 at a leading edge 48 and a trailing edge 50. The fan blades 14 may be made from suitable high strength materials such as metal alloys (e.g. iron, nickel, or titanium alloys) or composite materials, such as carbon reinforcing fibers in an epoxy matrix, with or without metallic shielding.

Each fan blade 14 has an axial dovetail at the root 40. These are received in axial dovetail slots of the rotor disk 12 which are defined between dovetail posts. When the fan blades 14 are assembled to the rotor disk 12, spaces 52 are defined between the adjacent fan blades 14.

The fan assembly 10 is provided with a platform apparatus 54 which defines an inboard flowpath surface 55 starting from a point upstream of the fan blades 14, through the spaces 52 between the individual fan blades 14, to a point downstream of the fan blades 14, so as to collectively define an inner flowpath boundary for channeling air flow F between the fan blades 14. Thus, the platform apparatus 54 functions to maintain the flowpath definition between the spinner 38 and the booster 34.

The basic components of the platform apparatus 54 include one or more forward segments 56, one or more aft segments 58, and a plurality of fillers 60.

Referring to FIGS. 4-6, each forward segment 56 includes an arcuate forward body 62. The platform apparatus 54 could include a plurality of forward segments 56, each spanning a portion of a circle, which are assembled together to collectively form a complete 360° annular ring. However, to achieve the maximum benefit of parts reduction as compared to prior art platform structures, the forward body 62 may be formed as a complete 360° ring. In the illustrated example, the forward body 62 is a complete 360° annular ring, and the platform apparatus 54 includes a single forward segment 56.

Each forward segment 56 includes one or more support members 64 extending radially inboard from the forward body 62. Any shape which is structurally sufficient to interconnect the forward body 62 and the rotor disk 12 may be used. In the illustrated example, the support member 64 comprises a hollow box-like column. As discussed in more detail below, means are provided for connecting the support member 64 to the rotor disk 12. In the illustrated example, the support member 64 has a slot 66 formed therein for this purpose.

Optionally, the forward end of the forward body 62 may incorporate an integral annular ring structure, referred to herein as an "aft support ring" 68, best seen in FIGS. 2 and 6. The aft support ring 68 functions to provide structural support and facilitate physical mounting of the spinner 38.

A plurality of individual, spaced-apart elements referred to herein as forward fingers 70 extend aft from the forward body 62. It will be understood that these may be formed as part of an integral, unitary or monolithic whole with the forward body 62. Each forward finger 70 includes an exterior surface 72 which is coextensive with an exterior surface of the forward body 62 and which defines a portion of the flowpath surface 55 described above. The lateral and axial extents of each forward finger 70 are bounded by spaced-apart first and second lateral edges 74, 76 interconnected by an aft edge 78.

The first lateral edge 74 is curved so as to conform to the shape of the adjacent fan blade 14, while the second lateral edge 76 follows a straight line oriented in the axial direction.

The shape of the forward finger 70 is explained in more detail with reference to FIG. 3, which is a flattened top plan view of the platform apparatus 54 in the installed condition. In this view, the concave pressure side 44 of the fan blade 14 extends between reference points labeled C and D. A straight reference line "L" extends in the axial direction between points C and D, which represent the furthest lateral extents of the pressure side 44 (i.e. the points on the pressure side 44 furthest to the right in FIG. 3).

The convex suction side 46 of the fan blade 14 extends between reference points labeled E and F. A straight reference line M extends through reference point B, which represents the furthest lateral extent of the suction side 46 (i.e. the point on the suction side 46 furthest to the left in FIG. 3).

The first lateral edge 74 is curved so as to conform to the shape of the adjacent fan blade 14, that is, it follows the shape of suction side 44 from reference point F to reference point B. The second lateral edge 76 is straight and oriented in the axial direction. Its lateral location is coincident with straight reference line L, and extends between reference point D and reference point A. Described another way, the lateral width of the forward finger 70 is less at its aft edge 78 than at the intersection of the forward finger 70 with the forward body 62. As will be described in more detail below, the shape of the forward finger 70 permits installation of the forward segment 56 using a purely axial movement.

The aft edge 78 interconnects the first lateral edge 74 and second lateral edge 76, and extends between reference point A and reference point B. It is skewed or positioned at an acute angle relative to the axial direction.

Referring to FIGS. 7-9, each aft segment 58 includes an arcuate aft body 80. The platform apparatus 54 could include a plurality of aft segments 58, each spanning a portion of a circle, which are assembled together to collectively form a complete 360° annular ring. However, to achieve the maximum benefit of parts reduction as compared to prior art platform structures, the arcuate aft body 80 may be formed as a complete 360° ring. In the illustrated example, the aft body 80 is a complete 360° annular ring, and the platform apparatus 54 includes a single aft segment 58.

Each aft segment 58 includes one or more support members 82 extending radially inboard from the aft body 80. Any shape which is structurally sufficient to interconnect the forward body 80 and the rotor disk 12 may be used. In the illustrated example, the support member 82 comprises a hollow box-like column. As discussed in more detail below, means are provided for connecting the support member 82 to the rotor disk 12. In the illustrated example, the support member 82 has a slot 84 formed therein for this purpose.

The aft segment 58 may include a mounting extension 83 which is an annular structure extending radially inward an axially aft from the body 80.

A plurality of individual, spaced-apart elements referred to herein as aft fingers 86 extend forward from the aft body 80. It will be understood that these may be formed as part of an integral, unitary or monolithic whole with the aft body 80. Each aft finger 86 includes an exterior surface 88 which is coextensive with an exterior surface of the aft body 80 and which defines a portion of the flowpath surface 55 described above. The lateral and axial extents of each aft finger 86 are bounded by spaced-apart first and second lateral edges 90, 92 interconnected by a forward edge 94.

In general, the first lateral edge 90 is curved so as to conform to the shape of the adjacent fan blade 14, while the second lateral edge 92 follows a straight line oriented in the axial direction.

The shape of the aft finger 86 is explained in more detail with reference to FIG. 3, using the same reference points A, B, C, D, E, F as described above.

The first lateral edge 90 is curved so as to conform to the shape of the adjacent fan blade 14, that is, it follows the shape of suction side 46 from reference point E to reference point B. The second lateral edge 92 is straight and oriented in the axial direction, and extends between reference point C and reference point A. Its lateral location is coincident with straight reference line L. Described another way, the lateral width of the aft finger 86 is less at its forward edge 94 than at the intersection of the aft finger 86 with the aft body 80. As will be described in more detail below, the shape of the aft finger 86 permits installation of the aft segment 58 using a purely axial movement.

When installed, the aft edges 78 of the forward fingers 70 abut the forward edges 94 of the aft fingers 86. This joint may be provided with some means to prevent flexing of the forward and aft fingers 70, Generally, either the forward fingers 70 or the aft fingers 86 would include a feature which protrudes in the axial direction and engages a complementary feature of the opposing finger to block radial movement, such as a rabbet, pin, tongue, etc. This structure referred to herein as an "interlocking joint". One example of a suitable interlocking joint shown in FIG. 10, namely a tongue-and-groove joint where the aft finger 86 includes a tongue 96 protruding axially forward that is received in a groove 98 of the forward finger 70.

When assembled, the second lateral edges 76, 92 of the forward and aft fingers 70, 86 collectively form a straight line which is spaced-away from the pressure side 44 of the fan blade 14, thus defining a gap. This gap is filled with a filler 60.

As seen in FIG. 3 the filler 60 is bounded by a linear first lateral edge 100 and an opposed curved (e.g. convex) second lateral edge 102. The first lateral edge 100 abuts the second lateral edges 76, 92 of the forward and aft fingers 70, 86, and the second lateral edge 102 abuts the pressure side 44 of the fan blade 14.

The filler 60 must be adequately retained, particularly in the radial direction, to ensure that it is not released from its installed position during a blade-out event or a birdstrike impact.

One exemplary embodiment of a suitable filler 60 is shown in FIGS. 11-14. In this embodiment, the filler 60 may be a monolithic or unitary body made of a rigid material such as a metal or a composite, and includes a flowpath side 104 and an opposed backside 106. A bracket 108 is attached to the non-flowpath side of the filler 60. The filler 60 is installed by placing it in the gap described above adjacent the pressure side 44 of the fan blade 14, and the bracket 108 is coupled to the support member 82 of the aft segment 58 using a conventional fastener 110, such as a screw or rivet.

Another exemplary embodiment of a suitable filler 160 is shown in FIGS. 15-17. In this embodiment, the filler may have a body 200 made of a resilient material such as a natural or synthetic elastomer, and includes a first lateral edge 202, opposed second lateral edge 204, a flowpath side 206, and an opposed backside 208.

In this example, a portion of the filler 160 is attached to the second lateral edge 92 of the aft finger 86 of the aft segment 58. The remaining portion of the filler 160 extends axially forward.

The filler 160 may incorporate a rigid element such as a channel-shaped stiffener 210, used to provide some stiffening to the body 200 and also to provide a means for mounting. In the illustrated example, the stiffener 210 is attached to the aft finger 86 using conventional fasteners 212 such as bolts or rivets, and the body 200 is attached to the stiffener 210 using conventional fasteners 216 such as bolts or rivets. In this configuration, the body 200 is physically secured to the aft finger 86, but is free to deflect upon compression, as seen by the dashed line in FIG. 17.

The forward and aft segments 56, 58 and the fillers 60 may be made of any material with acceptable structural properties (e.g. strength, weight, stiffness) for the anticipated operational loads. Nonlimiting examples of suitable materials include metal alloys and nonmetallic composite materials.

As noted above, the platform apparatus 54 may be assembled and installed using purely axial movements of the various components. This greatly simplifies installation as compared to prior art platforms. An example of a suitable installation process is as follows, referring to FIGS. 2 and 3:

First, the aft segments 58 are installed by placing them into position aft of the rotor disk 12 and moving them axially forward so that the aft fingers 86 enter the spaces 52 between the fan blades 14 and the aft support members 82 engage clips 162 which are mounted to the outer surface 20 of the rotor disk 12 (i.e. via slots 84). The aft segment 58 is axially retained by an extension 83 which is attached to the booster spool that is present downstream of the fan rotor. This extension 83 could be attached with conventional fasteners such as bolts 85, or some other type of mechanical connection. This connection may be configured to permit rotation of the aft segment 58 about a roll axis in order to provide compliance for a blade-out situation).

If the aft segments 58 include integral fillers 160 is described above, installation of the fillers 160 occurs simultaneous to the installation of the aft segments 86.

Next, the fan blades 14 are inserted into the dovetail slots of the rotor disk 12, so that the fan blades 14 fit into the spaces between the aft fingers 86.

Next, if separate fillers 60 are used, they are installed and secured by the selected method. For example, if the bracket 108 in FIG. 14 is used, then and appropriate fastener 110 would be used to connect to the bracket 108 to the support member 82.

Next, the forward segments 56 are installed by placing them into position concentric with the rotor disk 12 and moving them axially aft so that the forward fingers 70 enter the spaces between the fan blades 14 and the support members 64 engage the clips 162 (i.e. via slots 66). Simultaneously, the interlocking features of the forward finger 70 and the aft fingers 86 would engage each other.

Finally, the spinner 38 and other hardware are installed. The forward segments 56 are axially retained by the presence of the spinner 38.

The platform apparatus described herein has advantages over the prior art. It will increase platform stiffness and consequently reduce weight. It will increase the fan leading edge cross section area for better aerodynamic performance. It will also simplify the assembly and decrease installation time by reducing the numbers of individual parts.

The foregoing has described a platform apparatus for a turbomachinery rotor. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A platform apparatus for use with a propulsion rotor of the type including an annular array of airfoils carried by a rotor disk, the platform apparatus comprising:
    at least one forward segment comprising an arcuate forward body having a plurality of spaced-apart axially-extending forward fingers, each of the forward fingers bounded by a curved first lateral edge and a straight second lateral edge, the first and second lateral edges being interconnected by an aft edge wherein the forward segment defines a flow path surface and an opposed back surface;
    at least one aft segment comprising an arcuate aft body having a plurality of spaced-apart axially-extending aft fingers, each of the aft fingers bounded by a curved first lateral edge and a straight second lateral edge, the first and second lateral edges being interconnected by a forward edge, wherein the aft segment defines a flow path surface and an opposed back surface, and wherein the aft edges have a shape complementary to a shape of the forward edges; and
    a plurality of fillers each having a straight first lateral edge and a curved second lateral edge.

2. The apparatus of claim 1 wherein the forward and aft edges include complementary interlocking structures.

3. The apparatus of claim 1 wherein at least one of forward body and the aft body forms a 360-degree ring.

4. The apparatus of claim 1 wherein at least one of the forward body and the aft body includes a support member extending from the back surface thereof.

5. A propulsion rotor apparatus, comprising:
    a rotatable rotor disk;
    a plurality of airfoils arrayed around the disk, such that a plurality of spaces are defined between adjacent airfoils, each airfoil having spaced-apart pressure and suction sides extending radially in span from a root to a tip, and extending axially in chord between spaced-apart leading and trailing edges; and
    a platform apparatus including:
        at least one forward segment comprising an arcuate forward body having a plurality of spaced-apart axially-extending forward fingers, each of the forward fingers bounded by a curved first lateral edge that abuts one of the airfoils, and a straight second lateral edge, the first and second lateral edges being interconnected by an aft edge, wherein the forward segment defines a flow path surface and an opposed back surface;
        at least one aft segment comprising an arcuate aft body having a plurality of spaced-apart actually-extending aft fingers, each of the aft fingers bounded by a curved first lateral edge that abuts one of the airfoils, and a straight second lateral edge, the first and second lateral edges being interconnected by a forward edge, wherein the aft segment defines a flow path surface and an opposed back surface, and wherein the forward and aft edges have complementary shapes and abut each other; and
        a plurality of fillers each having a straight first lateral edge abutting the second lateral edges of corresponding forward and aft fingers, and a curved second lateral edge abutting one of the blades.

6. The apparatus of claim 5 wherein each forward finger has a greater width at its intersection with the forward body than at the aft edge.

7. The apparatus of claim 5 wherein each aft finger has a greater width at its intersection with the aft body then at the forward edge.

8. The apparatus of claim 5 wherein the forward and aft edges include complementary features forming an interlocking joint.

9. The apparatus of claim 8 wherein the interlocking joint is a tongue-and-groove joint.

10. The apparatus of claim 5 wherein the body of each of the segments includes a support member extending from the back surface thereof which is coupled to the rotor disk.

11. The apparatus of claim 10 wherein each support member includes a slot which engages a clip which is connected to the rotor disk.

12. The apparatus of claim 5 wherein the platform apparatus includes a single forward segment, the body of which is a 360-degree ring.

13. The apparatus of claim 12 wherein the forward segment includes an arcuate support ring formed on the body opposite the fingers.

14. The apparatus of claim 5 wherein the platform apparatus includes a single aft segment, the body of which is a 360° ring.

15. The apparatus of claim 14 wherein the aft segment includes an arcuate extension extending radially inboard from the back surface of the aft body.

16. The apparatus of claim 5 wherein at least one of the fillers is connected to one of the aft bodies by means of a bracket.

17. The apparatus of claim 5 wherein at least one of the fillers comprises a resilient material.

18. The apparatus of claim 5 wherein at least one of the fillers includes a resilient material and a stiffener.

19. The apparatus of claim 5 wherein at least one of the fillers includes a resilient material and extends beyond the forward edge of the aft finger.

* * * * *